US012020396B2

(12) United States Patent
Greene

(10) Patent No.: US 12,020,396 B2
(45) Date of Patent: *Jun. 25, 2024

(54) SYSTEMS AND METHODS FOR GRAPHICS ADJUSTMENT BASED ON OUTPUT RESOLUTION

(71) Applicant: DISH Network L.L.C., Englewood, CO (US)

(72) Inventor: Gregory H. Greene, Littleton, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,772

(22) Filed: Oct. 8, 2021

(65) Prior Publication Data

US 2022/0028033 A1 Jan. 27, 2022

Related U.S. Application Data

(63) Continuation of application No. 15/695,856, filed on Sep. 5, 2017, now Pat. No. 11,170,467.

(51) Int. Cl.
*G06T 3/40* (2006.01)
*G06F 13/10* (2006.01)
(Continued)

(52) U.S. Cl.
CPC .............. *G06T 3/40* (2013.01); *G06F 13/105* (2013.01); *G06F 13/12* (2013.01); *G09G 3/20* (2013.01);
(Continued)

(58) Field of Classification Search
CPC ......... G06T 3/40; G06F 13/105; G06F 13/12; G09G 3/20; G09G 2320/0606;
(Continued)

(56) References Cited

U.S. PATENT DOCUMENTS 5,119,082 A 6/1992 Lumelsky et al.
5,914,753 A 6/1999 Donovan
(Continued)

OTHER PUBLICATIONS

"Decision on Appeal", Appeal 2020-000150, U.S. Appl. No. 15/695,856, filed Apr. 20, 2021, 18 pages.

*Primary Examiner* — Jin Cheng Wang
(74) *Attorney, Agent, or Firm* — Jeremiah J. Baunach; VLP Law Group LLP

(57) ABSTRACT

A graphics adjustment system detects the video resolution of digital video to be output by a receiving device and saves the graphics settings input by the user when the user adjusts the graphics settings on the receiving device such that the digital video being presented in the presentation device is not cut off due to overscanning. The system saves the graphics adjustment settings as the setting to use going forward for digital video of that same resolution for that particular presentation device. In this manner, the digital video output from the receiving device will not be cut off when presented on the presentation device, even when the receiving device is switching between receiving digital video programming of different resolutions from various program distributors and/or the content providers.

18 Claims, 6 Drawing Sheets

(51) Int. Cl.
*G06F 13/12* (2006.01)
*G09G 3/20* (2006.01)
*H04N 5/14* (2006.01)
*H04N 5/46* (2006.01)
*H04N 21/44* (2011.01)
*H04N 21/4402* (2011.01)

(52) U.S. Cl.
CPC .................. *H04N 5/14* (2013.01); *H04N 5/46* (2013.01); *H04N 21/44008* (2013.01); *H04N 21/440263* (2013.01); *G09G 2320/0606* (2013.01); *G09G 2320/0613* (2013.01); *G09G 2320/08* (2013.01); *G09G 2340/0442* (2013.01); *G09G 2340/045* (2013.01); *G09G 2340/14* (2013.01); *G09G 2354/00* (2013.01)

(58) Field of Classification Search
CPC ....... G09G 2320/0613; G09G 2320/08; G09G 2340/0442; G09G 2340/045; G09G 2340/14; G09G 2354/00; H04N 5/14; H04N 5/45; H04N 21/44008; H04N 21/440263
See application file for complete search history.

(56) References Cited

U.S. PATENT DOCUMENTS

| | | | |
|---|---|---|---|
| 6,456,305 B1 | 9/2002 | Qureshi et al. | |
| 6,853,385 B1 | 2/2005 | MacInnis et al. | |
| 7,600,189 B2 | 10/2009 | Fujisawa | |
| 7,755,702 B2* | 7/2010 | Muto | H04N 21/47 382/268 |
| 7,861,166 B1 | 12/2010 | Hendricks | |
| 7,864,203 B1* | 1/2011 | Fear | G09G 5/363 345/428 |
| 8,819,556 B1* | 8/2014 | Balev | G06F 3/0482 715/788 |
| 11,170,467 B2* | 11/2021 | Greene | G06T 3/40 |
| 2006/0114246 A1* | 6/2006 | Young | H04N 7/0122 345/204 |
| 2009/0219443 A1* | 9/2009 | Kimura | H04N 21/47 348/E5.119 |
| 2009/0251594 A1 | 10/2009 | Hua et al. | |
| 2009/0310016 A1* | 12/2009 | Fukuda | H04N 21/47 348/E7.003 |
| 2009/0316795 A1* | 12/2009 | Chui | H04N 19/61 375/E7.018 |
| 2009/0322949 A1* | 12/2009 | Masuda | H04N 21/44008 348/E5.062 |
| 2010/0053425 A1* | 3/2010 | Okumoto | H04N 5/76 348/E7.003 |
| 2010/0053442 A1* | 3/2010 | Kudo | H04N 21/4828 348/581 |
| 2010/0066909 A1* | 3/2010 | Miyazaki | H04N 21/4316 348/731 |
| 2011/0176786 A1* | 7/2011 | Cooper | H04N 5/46 386/230 |
| 2012/0127324 A1 | 5/2012 | Dickins et al. | |
| 2013/0258200 A1* | 10/2013 | Kobayashi | H04N 21/4858 348/660 |
| 2015/0256891 A1 | 9/2015 | Kim et al. | |
| 2016/0100222 A1* | 4/2016 | Conter | H04N 21/44008 725/86 |
| 2016/0219326 A1* | 7/2016 | Borsum | H04N 21/4402 |
| 2018/0130180 A1* | 5/2018 | Wang | G06N 3/0445 |
| 2018/0241965 A1* | 8/2018 | Taylor | H04N 7/0117 |
| 2020/0053311 A1* | 2/2020 | Ogiso | H04N 23/88 |

* cited by examiner

SYSTEMS AND METHODS FOR GRAPHICS ADJUSTMENT BASED ON OUTPUT RESOLUTION

TECHNICAL FIELD

The technical field relates to digital video, and particularly to providing graphics adjustments to digital video.

BRIEF SUMMARY

Systems and methods for graphics adjustment detect the video resolution of the digital video to be output by a receiving device and saves the graphics settings input by the user when the user adjusts the graphics settings on the receiving device such that the digital video being presented in the presentation device is not cut off. The system saves the graphics adjustment setting as the setting to use going forward for digital video of that same resolution for that particular presentation device. The system may also indicate that setting is to be used for a particular resolution on a particular presentation device, as different presentation devices may require different graphics adjustment settings for digital video of different resolutions.

In some embodiments, each time digital video is received by the system, the system checks a database to see if there is a previously stored graphics adjustment setting for that particular resolution. If found in the database, the system will then apply the previously stored graphics adjustment setting for that particular resolution to the digital video before it is output to the presentation device. In this manner, the digital video output from the receiving device will not be cut off when presented on the presentation device, even when the receiving device is switching between receiving digital video programming of different resolutions from various program distributors and/or the content providers.

BRIEF DESCRIPTION OF THE DRAWINGS

The components in the drawings are not necessarily to scale relative to each other. Like reference numerals designate corresponding parts throughout the several views.

DETAILED DESCRIPTION

Many televisions and presentation devices perform what is referred to as overscanning of video being presented on the display, which results in a situation in which the entire digital video frame is not presented on a display of the presentation device and thus, the edges of the digital video frames are cut off. This often results in 3% to 10% (or more) of the digital video image being cut off. Also, the amount and effect of the overscan problem can change based on the particular resolution of the digital video being input to the presentation device by the receiving device 118 and also the particular display. Graphics adjustments may be made to the video to be output to the presentation device, such as resizing or repositioning the frames of the digital video before the overscan by the presentation device is performed. For example, the resizing of the digital video content may include downscaling of digital video frames of the digital video content such that the entire video frame fits into a smaller area on the screen which then allows for edges of the originally sized area to be cut off without losing any part of the scene.

Even if a user may be able to manually make such graphics settings adjustments on the receiving device as the video is being output to the presentation device to make the entire image appear on the presentation device, when the receiving device receives video of a different resolution, it may appear cut off again when presented on the display of the same presentation device. Thus, the systems and methods for graphics adjustment described herein detect the video resolution of the digital video to be output by the receiving device and save the graphics settings input by the user when the user adjusts the graphics settings on the receiving device such that the digital video being presented on the presentation device is not cut off. The system saves the graphics adjustment setting as the setting to use going forward for digital video of that same resolution for that particular presentation device. The system may also indicate that setting is to be used for a particular resolution on a particular presentation device, as different presentation devices may require different graphics adjustment settings for digital video of different resolutions.

Figure 1:
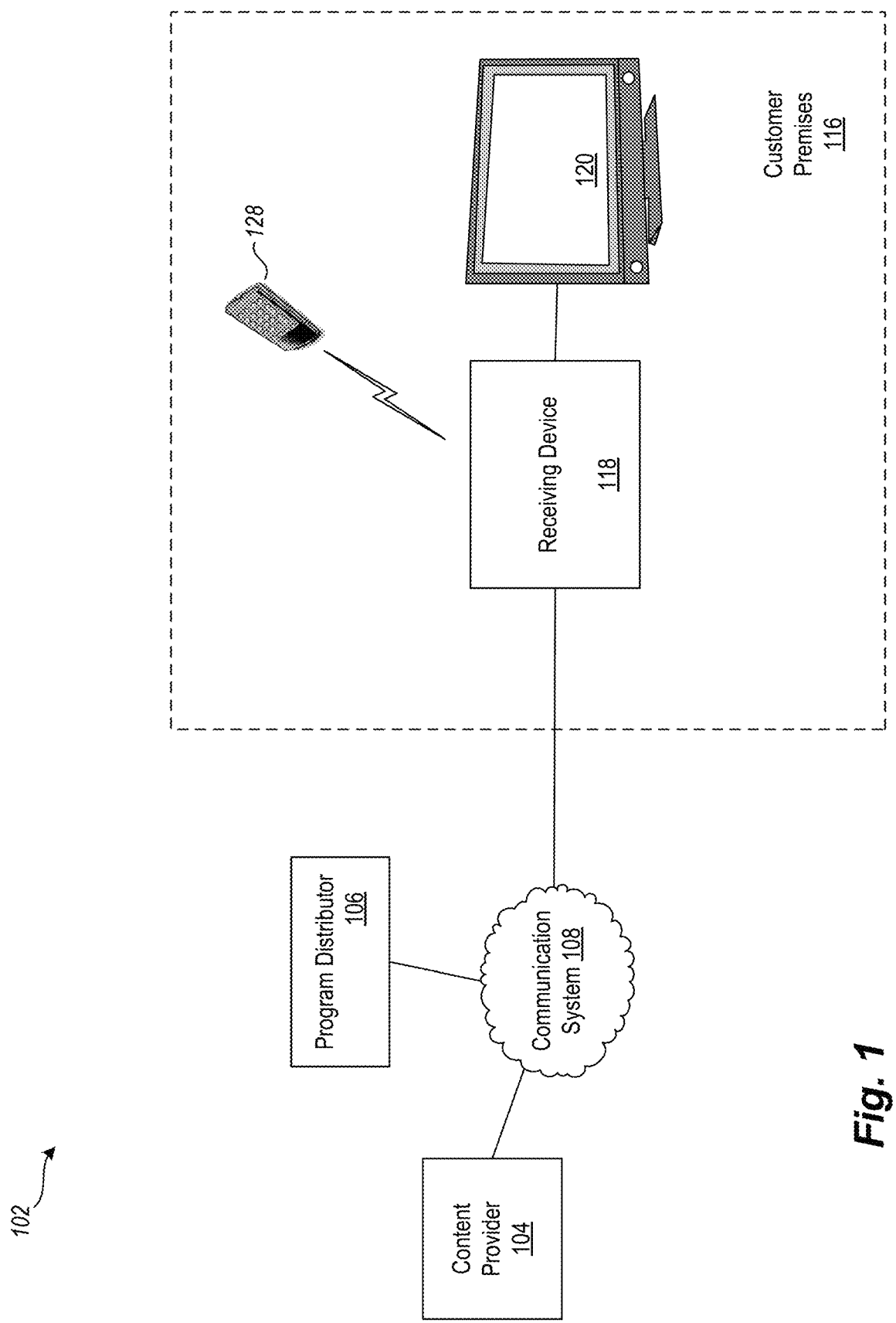
FIG. 1 is an overview block diagram illustrating an example content distribution environment in which embodiments of systems and methods for graphics adjustment based on output resolution may be implemented, according to one example embodiment.

FIG. 1 is an overview block diagram illustrating an example content distribution environment 102 in which embodiments of systems and methods for graphics adjustment based on output resolution may be implemented, according to one example embodiment.

Before providing additional details regarding the operation and constitution of systems and methods for graphics adjustment based on output resolution, the example content distribution environment 102, within which such a system may operate, will briefly be described.

In the content distribution environment 102, audio, video, and/or data service providers, such as television service providers, provide their customers a multitude of video and/or data programming (hereafter, collectively and/or exclusively "programming"). Such programming is often provided by use of a receiving device 118 communicatively coupled to a presentation device 120 configured to receive the programming. The programming may include any type of media content, including, but not limited to: television shows, news, movies, sporting events, advertisements, etc. In various embodiments any of this programming may be provided as a type of programming referred to as streaming media content, which is generally digital multimedia data that is substantially constantly received by and presented to an end-user or presented on a device while being delivered by a provider from a stored file source. Its verb form, "to stream", refers to the process of delivering media in this manner. The term refers to how the media is delivered rather than the media itself.

The receiving device 118 interconnects to one or more communications media or sources. For example, the various media content may be delivered as data using the Internet protocol (IP) suite over a packet-switched network such as the Internet or other packet-switched network. The underlying connection carrying such data may be via a cable head-end, satellite antenna, telephone company switch, cellular telephone system, Ethernet portal, off-air antenna, or the like. The receiving device 118 may receive a plurality of programming by way of the communications media or sources, or may only receive programming via a particular channel or source. This programming may be received or formatted by the receiving device in various different formats and resolutions. In some embodiments, based upon selection by a user, the receiving device 118 processes and communicates the selected programming to the presentation device 120. Also, in some embodiments, the presentation device 120 may also be a receiving device 118 or have a receiving device 118 integrated within it.

For convenience, examples of a receiving device 118 may include, but are not limited to devices such as, or any combination of: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," and/or "television tuner," etc. Accordingly, the receiving device 118 may be any suitable converter device or electronic equipment that is operable to receive or playback programming. Further, the receiving device 118 may itself include user interface devices, such as buttons or switches. In some example embodiments, the receiving device 118 may be configured to receive and decrypt content according to various digital rights management (DRM) and other access control technologies and architectures as part of the process of graphics adjustment based on output resolution to the receiving device 118, which will be described in further detail below.

In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like, including, but not limited to devices using Bluetooth® wireless technology, Wi-Fi® wireless technology, Radio Frequency for Consumer Electronics (RF4CE) wireless technology, etc. In the present example embodiment, the remote 128 is configured, according to an example embodiment, to input graphics adjustment settings to the receiving device 118, which will be described in further detail below. In other embodiments, the remote 128 could instead or also be a smart phone, tablet or other device that could has software program and/or hardware elements that would allow a service provider to use it with the receiving device 118.

Examples of a presentation device 120 may include, but are not limited to, one or a combination of the following: a television ("TV"), a personal computer ("PC"), a sound system receiver, a digital video recorder ("DVR"), a compact disk ("CD") device, DVD Player, game system, tablet device, smart phone, mobile device or other computing device or media player, and the like and is able to display video of various resolutions. Presentation devices 120 employ a display, one or more speakers, and/or other output devices to communicate video and/or audio content to a user.

In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A content provider 104 provides program content, such as television content, to a distributor, such as the program distributor 106. Example content providers include television stations which provide local or national television programming and special content providers which provide premium based programming, pay-per-view programming and on-demand programming.

Program content (i.e., a program including or not including advertisements), is communicated to the program distributor 106 from the content provider 104 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of, telephone systems, the Internet, cable systems, fiber optic systems, microwave systems, asynchronous transfer mode ("ATM") systems, frame relay systems, digital subscriber line ("DSL") systems, radio frequency ("RF") systems, cellular systems, and satellite systems.

In at least one embodiment, the received program content is converted by the program distributor 106 into a suitable signal (a "program signal") that is ultimately communicated to the receiving device 118. Various embodiments of the receiving device 118 may instead receive programming from program distributors 106 and/or directly from content providers 104 via locally broadcast RF signals, cable, fiber optic, Internet media, or the like via the communication system 108.

For example, Video on Demand (VOD) systems may allow a user of the receiving device 118 to select, watch and/or listen to video and audio content on demand of various different resolutions. For example "Internet Television" and "Internet Protocol Television" (IPTV) are systems through which various media content is delivered using the Internet protocol (IP) suite over a packet-switched network such as the Internet represented by communication system 108 to the receiving device 118, instead of being delivered through traditional channels using terrestrial, satellite signal, and cable television formats of the communication system 108, and thus may be delivered at various different video resolutions. In various example embodiments, such technologies are deployed within the content distribution environment 102 such as in subscriber-based telecommunications networks of the communication system 108 with high-speed access channels into the customer premises 116 via the receiving device 118 (e.g., a set-top box or other customer-premises equipment) to bring VOD services to the customer premises 116.

In various example embodiments, television VOD systems stream media content of various resolutions via the communications system 108 under direct or indirect control of the program distributor 106 to the receiving device 118. Television VOD systems may stream content to a receiving device 118 such as a set-top box, DVD player, game system, smart phone, television (including a smart TV), PC, a sound system receiver, a digital video recorder ("DVR"), a compact disk ("CD") device, tablet device, mobile device or other computing device or media player, and the like, allowing viewing in real time at the customer premises 116, or download it to a receiving device 118 such as a computer, DVR (also called a personal video recorder) or portable media player for viewing at any time. The program distributor 106 may offer VOD streaming of various different resolutions, including pay-per-view and free content, whereby a user buys or selects a movie or television program and it begins to play on the presentation device 120 almost instantaneously, offer downloading of the media content to a DVR rented from the program distributor, and/or offer downloading the content onto a computer or mobile device, for viewing in the future.

In some embodiments, the receiving device 118 may be a set-top box that is typically provided by the cable provider, satellite provider, or other program distributor 106 to which the customer may subscribe to receive such on-demand services at various different resolutions, and that also receives programming through traditional channels using a terrestrial, satellite signal, and/or cable television format, which may also be at various different resolutions. However, in many embodiments, the receiving device 118 may instead be other user equipment than the set-top box such as a television, DVR, DVD player, Tablet, PC, Smart Phone or other media player not provided by or controlled by the cable provider, satellite provider, or other program distributor 106 to which the customer subscribes for such on-demand services.

Often, as described above, the video received by the receiving device 118 from various different sources described above may be of various different resolutions. Even if the presentation device 120 is capable of displaying digital video of various different resolutions, the digital video of the various different resolutions output by the receiving device may not display properly on the presentation device 120 due to overscanning by the presentation device, which results in edges being cut off of the digital video frames when displayed on the presentation device 120. However, the systems and methods described herein for graphics adjustment based on output resolution provide solutions which overcome this difficulty and enables the presentation device to display digital video of various different resolutions without the user having to adjust the graphics settings of the presentation device 120 or receiving device 118 each time when switching to video of a different resolutions to avoid having the edges of the frame cut off.

The above description of the content distribution environment 102, the customer premises 116, and the various devices therein, is intended as a broad, non-limiting overview of an example environment in which various embodiments of graphics adjustment based on output resolution may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein.

Example embodiments described herein provide applications, tools, data structures and other support to implement graphics adjustment based on output resolution. Other embodiments of the described techniques may be used for other purposes, including graphics adjustment based on output resolution for digital video to be transmitted to, recorded by or played by various other receiving devices, content distribution equipment, DVD players and recorders, digital recorders, computers, peripherals, mobile devices, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
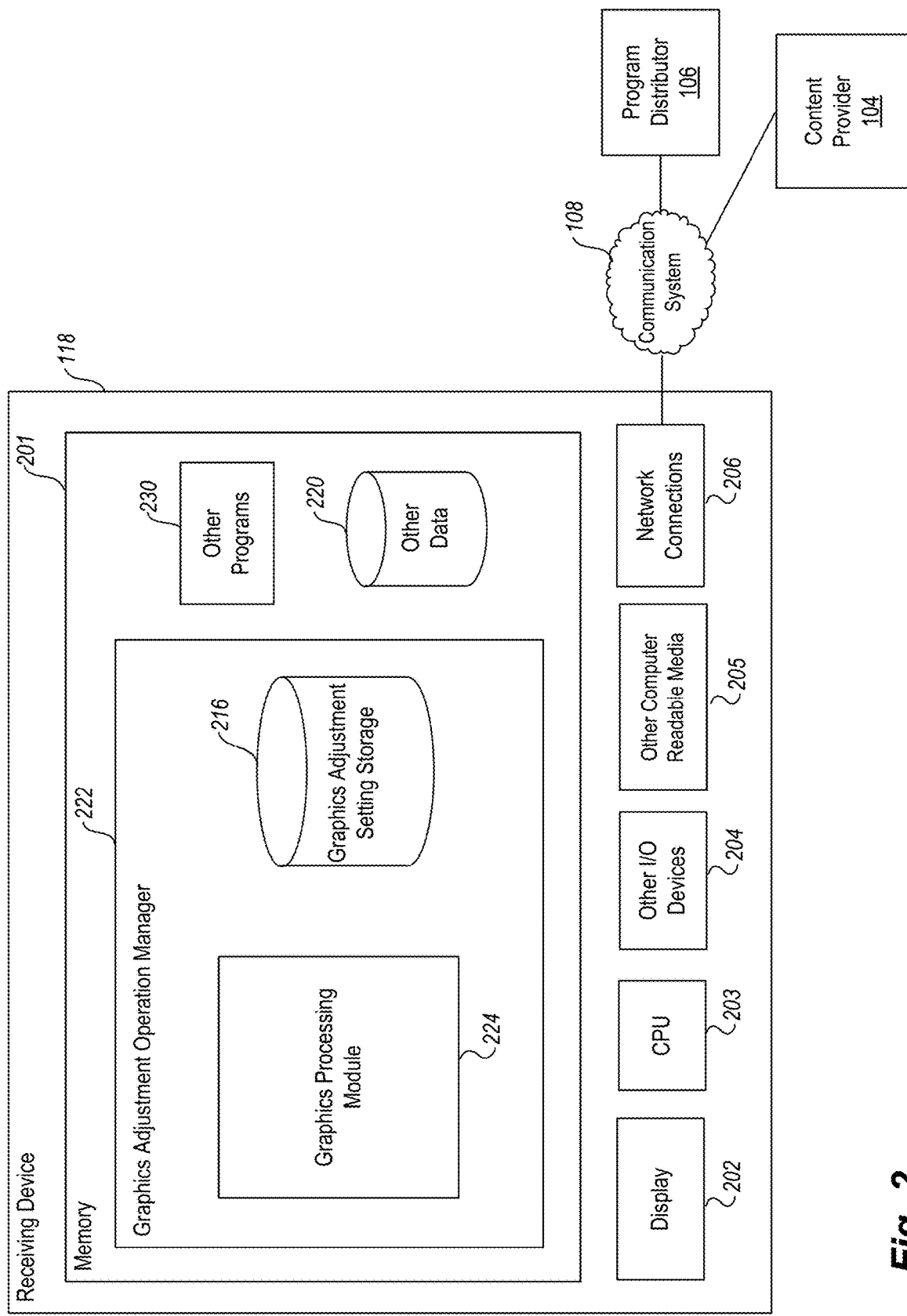
FIG. 2 is a block diagram illustrating elements of an example receiving device used in graphics adjustment based on output resolution, according to one example embodiment.

FIG. 2 is a block diagram illustrating elements of an example receiving device 118 used in providing graphics adjustment based on output resolution, according to one example embodiment.

In one embodiment, the receiving device 118 is a device such a television, DVR, DVD player, PC, tablet device, game machine, smart phone, mobile device or other computing device or media player configured to receive and process media content, including digital video content, and to display such programming on a presentation device. In other embodiments, the receiving device 118 is a set-top box configured to receive, process and display on a presentation device streaming media content programs and/or other programming such as cable or satellite television broadcasts via various other physical and logical channels of communication.

Note that one or more general purpose or special purpose computing systems/devices may be used to operate the receiving device 118, store information regarding the receiving device 118, store graphics adjustment settings and communicate with the content provider 104 and/or program distributor 106. In addition, the receiving device 118 may comprise one or more distinct computing systems/devices and may span distributed locations. Furthermore, each block shown may represent one or more such blocks as appropriate to a specific embodiment or may be combined with other blocks. Also, the graphics adjustment operation manager 222 may be implemented in software, hardware, firmware, or in some combination to achieve the capabilities described herein.

In the embodiment shown, receiving device 118 comprises a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output devices 204 (e.g., button panel, keyboard, mouse, RF or infrared receiver, universal serial bus (USB) ports, other communication ports, and the like), other computer-readable media 205, and network connections 206. The graphics adjustment operation manager 222 is shown residing in memory 201. In other embodiments, some portion of the contents and some, or all, of the components of the graphics adjustment operation manager 222 may be stored on and/or transmitted over the other computer-readable media 205. The components of the receiving device 118 and graphics adjustment operation manager 222 preferably execute on one or more CPUs 203 and facilitate the receiving, decrypting, decoding, processing, scaling, resizing, re-positioning, selecting, recording, playback and displaying of programming, as described herein. The graphics adjustment operation manager 222 may also facilitate on-demand media services (e.g., VOD services), on-demand program ordering and process received streaming media content and other programming. The graphics adjustment operation manager 222 may operate as, be part of, or work in conjunction and/or cooperation with various on-demand service software applications stored in memory 201. The graphics adjustment operation manager 222 also facilitates communication with peripheral devices and the remote 128, via the I/O devices 204 and with remote systems (e.g., the content provider 104 and/or the program distributor 106) via the network connections 206.

Recorded or buffered programming received as streaming media content or other types of programming may reside on the other data repository 220, for storing, processing and displaying of the received media content according to the applicable resolution associated with the digital video of the particular programming. The other data repository 220 may also store various program metadata associated with the recorded or buffered programming stored in the other data repository 220, such as that including, but not limited to, resolution indicators, format indicators, tags, codes, identifiers, format indicators, timestamps, user identifications, authorization codes, digital signatures, etc.

The graphics processing module 224 is configured to process the digital video content, including detecting the resolution of the digital video content, apply graphics adjustments according to the detected resolution and render the data for display on a particular presentation device according to the graphics adjustment settings stored in the graphics adjustment setting storage 216.

In one embodiment, the graphics processing module 224 detects the resolution of digital video content to be output from the receiving device 118 to a display, such as presentation device 120 shown in FIG. 1. Digital video resolution refers to the number of distinct pixels in each dimension that the digital video is able to provide in its native format for display on a display capable of the same display resolution. A video frame is composed of lines. In digital video, each line is sampled to create a number of pixels (samples) per line. The more lines there exists per frame, the higher the image resolution. The more pixels there exists per line, the higher the resolution of each line. For example, High definition (HD) video with 1080 lines uses 1920 pixels per line (1920×1080 pixels). HD video with 720 lines uses 1280 pixels per line (1280×720 pixels). Both of these formats have an aspect ratio of 16:9. "4K Ultra High Definition", or "4K UHD", is for displays that have an aspect ratio of 16:9 or wider and at least one digital input capable of carrying and presenting native video at a minimum resolution of 3840×2160 pixels. "8K Ultra High Definition", or "8K UHD", is 7680 pixels wide by 4320 pixels tall (7680×4320 pixels). Other resolutions exist and the systems and methods for graphics adjustment based on output resolution may be applied to various other resolutions as well. The detection of the digital video resolution by the graphics processing module 224, for example, may be performed by the graphics processing module 224 reading applicable metadata from the digital video signal being input to the receiving device which indicates the resolution of the digital video being received. However, other methods of detecting video resolution may be implemented.

Many televisions and presentation devices perform what is referred to as overscanning of video being presented on the display, which in effect results in a situation in which the entire digital video frame is not presented on a display of the presentation device and thus, the edges of the digital video frames are cut off. This often results in 3% to 10% (or more) of the digital video image being cut off. Also, the amount and effect of the overscan problem can change based on the particular resolution of the digital video being input to the presentation device by the receiving device 118 and also the particular display. Graphics adjustment may be made to the video to be output to the presentation device, such as resizing or repositioning the frames of the digital video before the overscan by the presentation device is performed. For example, the resizing of the digital video content may include downscaling of digital video frames of the digital video content such that the entire video frame fits into a smaller area on the screen which then allows for edges of the originally sized area to be cut off without losing any part of the scene. In some embodiments, such an adjustment may indicate an x,y pixel coordinates defining an area in which the digital video information is to be rendered or presented.

Even if a user may be able to manually make such graphics settings adjustments on the receiving device 118 as the video is being output to the presentation device to make the entire image appear on the presentation device, when the receiving device 118 receives video of a different resolution, it may appear cut off again when presented on the display of the same presentation device. Thus, the graphics processing module 224 detects the video resolution of the digital video to be output by the receiving device 118 and saves the graphics settings input by the user when the user adjusts the graphics settings on the receiving device 118 such that the digital video being presented on the presentation device is not cut off. The graphics processing module 224 saves the graphics adjustment settings in the graphics adjustment setting storage 216 as the setting to use for digital video of that same resolution going forward for that particular presentation device. The graphics processing module 224 may also indicate that setting is to be used for a particular resolution on a particular presentation device, as different presentation devices may require different graphics adjustment settings for digital video of different resolutions. The graphics processing module 224 does the above process for digital video programming of different resolutions such that the graphics adjustment setting storage 216 has graphics adjustment settings stored for digital video of various different resolutions.

Each time digital video is received by the graphics processing module 224, the graphics processing module 224 may then check the graphics adjustment setting storage 216 database to see if there is a previously stored graphics adjustment setting for that particular resolution (and in some embodiments, the particular presentation device to which the video is to be output). If found in the graphics adjustment setting storage 216, the graphics processing module 224 will then apply the previously stored graphics adjustment setting for that particular resolution to the digital video before it is output to the presentation device. In this manner, the digital video output from the receiving device 118 will not be cut off when presented on the presentation device, even when the receiving device 118 is switching between receiving digital video programming of different resolutions from the program distributor 106 and/or the content provider 104.

In response to detecting the resolution of the digital video content to be output from the receiving device 118 to the display, the graphics processing module 224 searches the graphics adjustment setting storage 216 database to check whether there exists a graphics adjustment setting. The graphics processing module 224 then retrieves and applies the previously stored video graphics adjustment setting having a previously stored association with the detected resolution of the digital video content. The previously stored association indicates that application of the video graphics adjustment setting to digital video content having the detected resolution avoids edges of digital video frames of digital video content having the detected resolution being cut of when presented on the display.

The graphics processing module 224 may also decode, decompress, format, translate, perform digital signal processing, adjust data rate and/or complexity or perform other processing on the data representing received media content as applicable for presenting the received content in real time on the presentation device as it is being received by the receiving device 118.

Other code or programs 230 (e.g., further audio/video processing modules, a program guide manager module, a Web server, and the like), and potentially other data repositories, such as data repository 220 for storing other data (user profiles, preferences and other configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the receiving device 118 and graphics adjustment operation manager 222 includes an application program interface ("API") that provides programmatic access to one or more functions of the receiving device 118 and operation manager 222. For example, such an API may provide a programmatic interface to one or more functions of the graphics adjustment operation manager 222 that may be invoked by one of the other programs 230, the remote 128, the program distributor 106, the content provider 104 or some other module. In this manner, the API may facilitate the development of third-party software, such as various different on-demand service applications, user interfaces, plug-ins, adapters (e.g., for integrating functions of the graphics adjustment operation manager 222 into desktop or mobile applications), and the like to facilitate graphics adjustment based on output resolution using the receiving device 118.

In an example embodiment, components/modules of the receiving device 118 and operation manager 222 are implemented using standard programming techniques. For example, the graphics adjustment operation manager 222 may be implemented as a "native" executable running on the CPU 203, along with one or more static or dynamic libraries. In other embodiments, the receiving device 118 and graphics adjustment operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the graphics adjustment operation manager 222. The instructions cause the CPU 203 or some other processor, such as an I/O controller/processor, to process the media program for display on a presentation device using the processes described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer (e.g., Bluetooth® wireless technology providing a communication channel between the receiving device 118 and the secure remote 128), running on one or more computer systems each having one or more CPUs or other processors. Some embodiments may execute concurrently and asynchronously, and communicate using message passing techniques. Equivalent synchronous embodiments are also supported by a graphics adjustment operation manager 222 implementation. Also, other functions could be implemented and/or performed by each component/module, and in different orders, and by different components/modules, yet still achieve the functions of the receiving device 118 and operation manager 222.

In addition, programming interfaces to the data stored as part of the receiving device 118 and graphics adjustment operation manager 222, can be available by standard mechanisms such as through C, C++, C#, and Java APIs; libraries for accessing files, databases, or other data repositories; scripting languages such as XML; or Web servers, FTP servers, or other types of servers providing access to stored data. The graphics adjustment setting storage 216 and other data 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the graphics adjustment operation manager 222.

Furthermore, in some embodiments, some or all of the components of the receiving device 118 and operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 3:
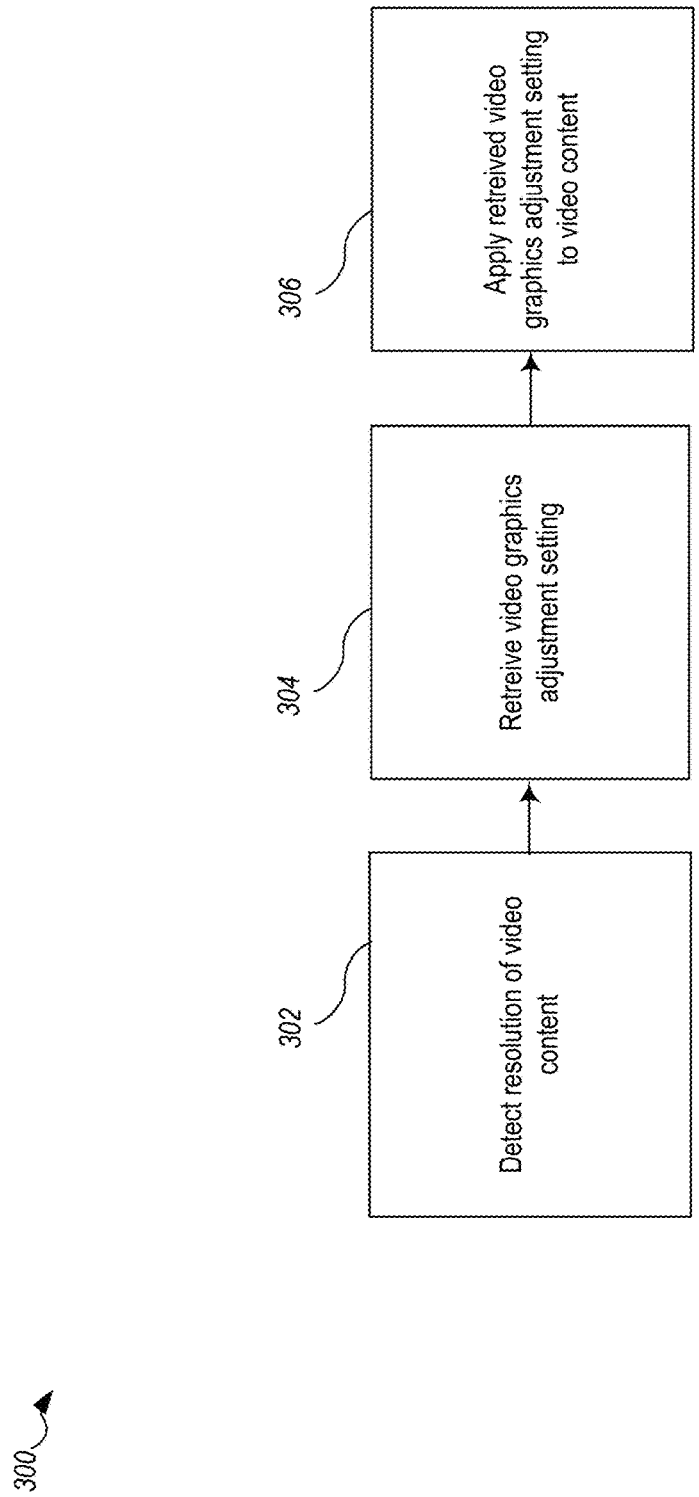
FIG. 3 is a flow diagram of a method of providing graphics adjustment based on output resolution, according to one example embodiment.

FIG. 3 is a flow diagram of a method 300 of providing graphics adjustment based on output resolution, according to one example embodiment.

At 302, the receiving device 118 detects a resolution of digital video content to be output from the receiving device to a display.

At 304, the receiving device 118, in response to detecting the resolution of the digital video content to be output from the receiving device to the display, retrieves, based on the detected resolution of the digital video content, a previously stored video graphics adjustment setting having a previously stored association with the detected resolution of the digital video content. The previously stored association is that application of the video graphics adjustment setting to digital video content having the detected resolution avoids edges of digital video frames of digital video content having the detected resolution being cut of when presented on the display.

At 306, the receiving device 118, in response to retrieving the previously stored video graphics adjustment, applies the previously stored video graphics adjustment setting to the digital video content to be output from the receiving device. In some embodiments, this is before the digital video content to be output from the receiving device is presented on the display.

Figure 4:
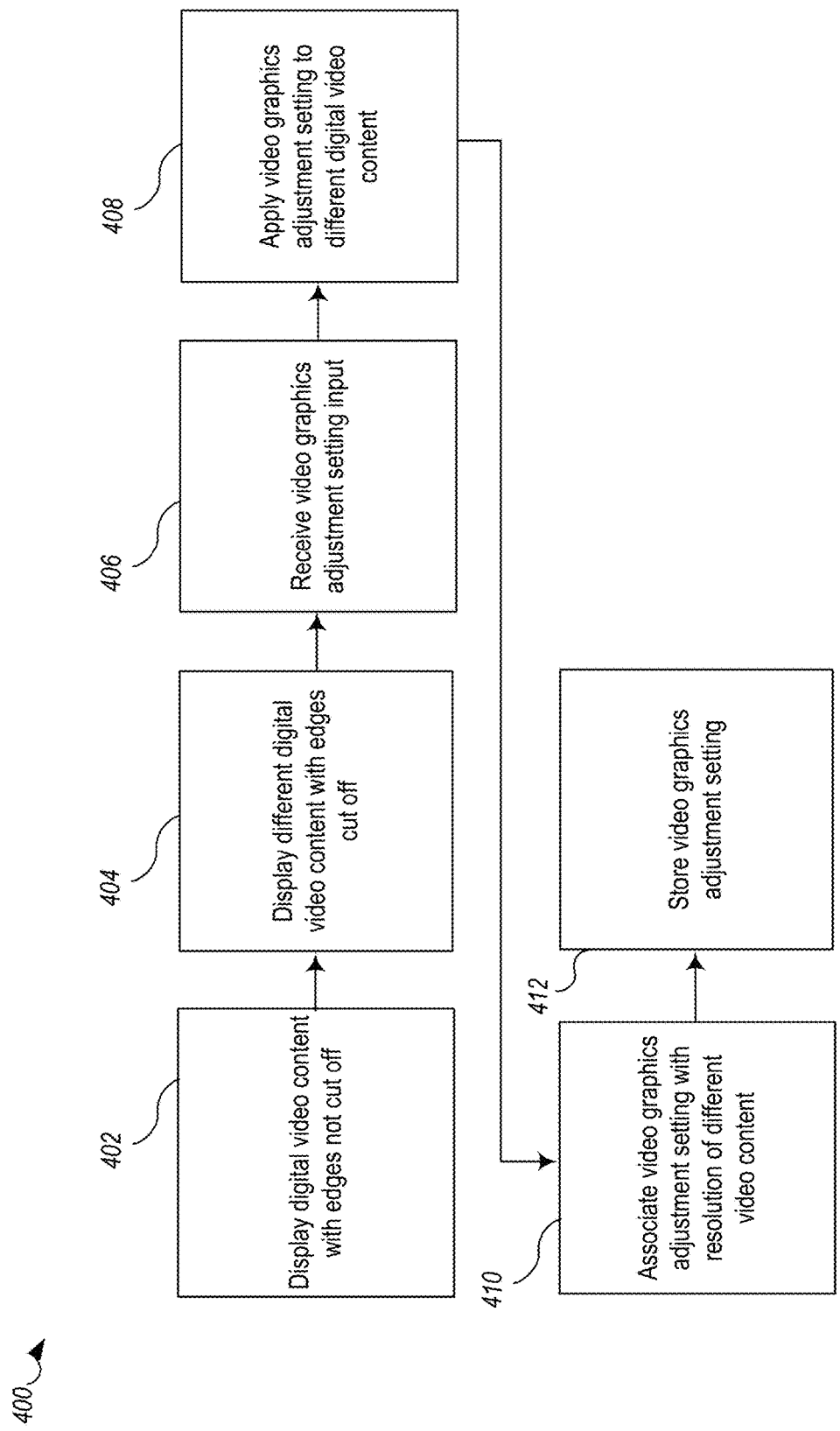
FIG. 4 is a flow diagram of a method of providing graphics adjustment based on output resolution, according to another example embodiment.

FIG. 4 is a flow diagram of a method 400 of providing graphics adjustment based on output resolution, according to another example embodiment.

At 402, the receiving device 118 outputs for presentation on a display digital video content for which edges of digital video frames of the digital video content are not cut off when presented on the display.

At 404, the receiving device 118 outputs for presentation on the display, different digital video content having a different resolution. In this case, the edges of digital video frames are cut off when presented on the display.

At 406, the receiving device 118 receives input from a user indicating a video graphics adjustment setting of the different digital video content, for example, as it is being displayed on the presentation device.

At 408, the receiving device 118 applies the video graphics adjustment setting to the different digital video content. This application of the graphics setting avoids the digital video frames of the different digital video content having the resolution being cut off when presented on the display. For example the user may use the remote 128 to input instructions to the receiving device 118 to resize the digital video content, which may cause the receiving device 118 to downscale the digital video frames of the digital video content such that the entire video frame fits into a smaller area on the screen which then allows for edges of the originally sized area to be cut off without losing any part of the scene.

At 410, the receiving device 118 associates the video graphics adjustment setting with the resolution of the different digital video content that was output to the display and, in some embodiments, with the particular presentation device.

At 412, the receiving device 118 stores, for future retrieval by a receiving device 118, the video graphics adjustment setting and the association of the video graphics adjustment setting with the resolution of the different digital video content that was output to the display.

Figure 5:
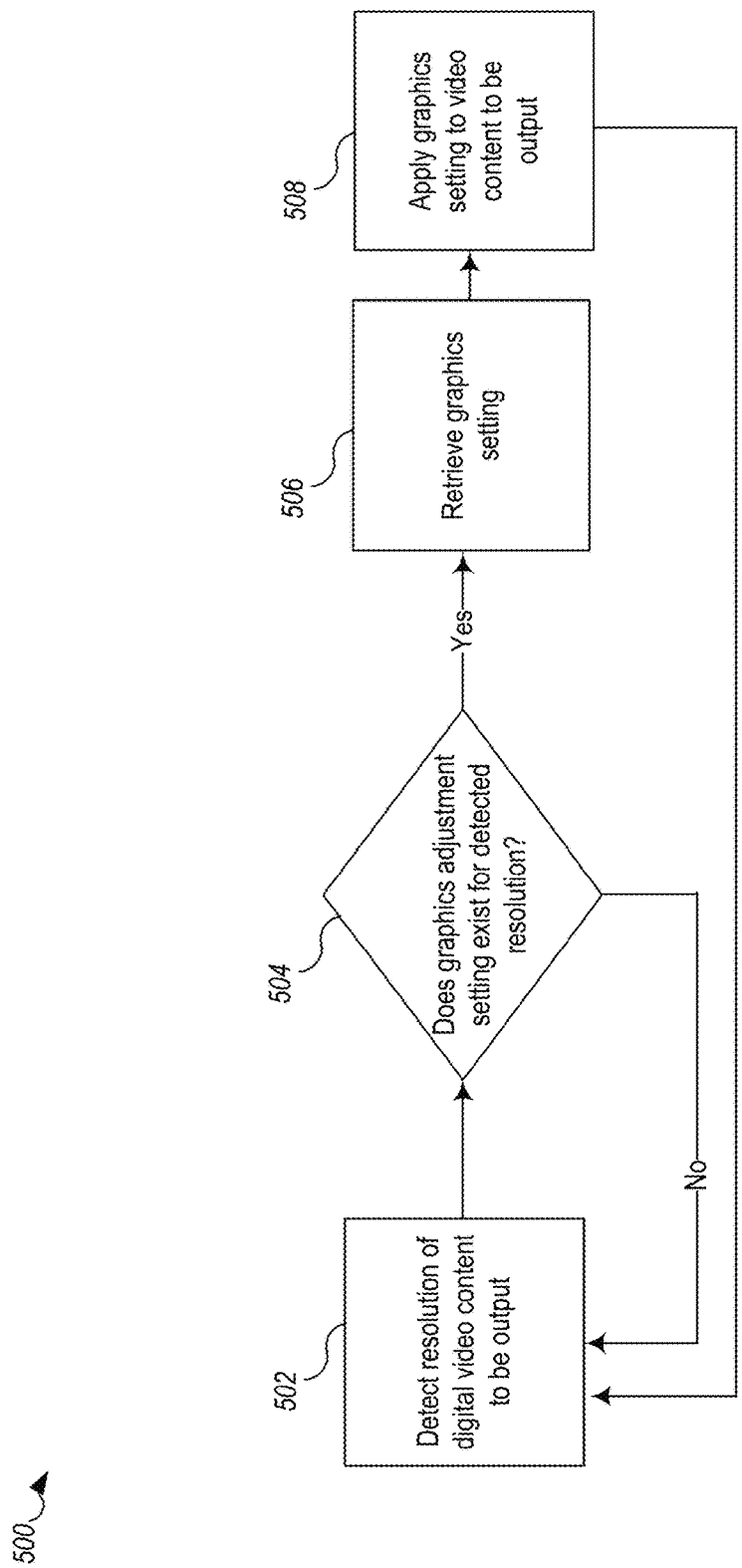
FIG. 5 is a flow diagram of a method of providing graphics adjustment based on output resolution, according to another example embodiment.

FIG. 5 is a flow diagram of a method 500 of providing graphics adjustment based on output resolution, according to another example embodiment.

At 502, the receiving device 118 detects different resolutions of different digital video content to be output from the receiving device to a display as the various different digital video content is received by the receiving device 118.

At 504, the receiving device 118 determines whether there exists in storage a corresponding video graphics adjustment setting associated with the detected different resolution of the digital video currently being received. The receiving device may perform this function by searching in its local and/or a remote database for a corresponding previously stored video graphics adjustment setting associated with the detected different resolution. The association with the detected resolution is that application of the corresponding previously stored video graphics adjustment setting to digital video content having the detected resolution avoids edges of digital video frames of digital video content having the detected resolution being cut of when presented on the display.

If the receiving device 118 determined there does not exist in storage a corresponding video graphics adjustment setting associated with the detected resolution, the process returns to 502.

At 506, if the receiving device 118 determined there does exist in storage a corresponding video graphics adjustment setting associated with the detected resolution, the receiving device 118 retrieves the corresponding previously stored video graphics adjustment setting from storage.

At 508, the receiving device 118, in response to the retrieving the corresponding previously stored video graphics adjustment setting, applies the corresponding previously stored video graphics adjustment setting to the current digital video content to be output from the receiving device. The process then returns to 502 to process further digital video content.

Figure 6:
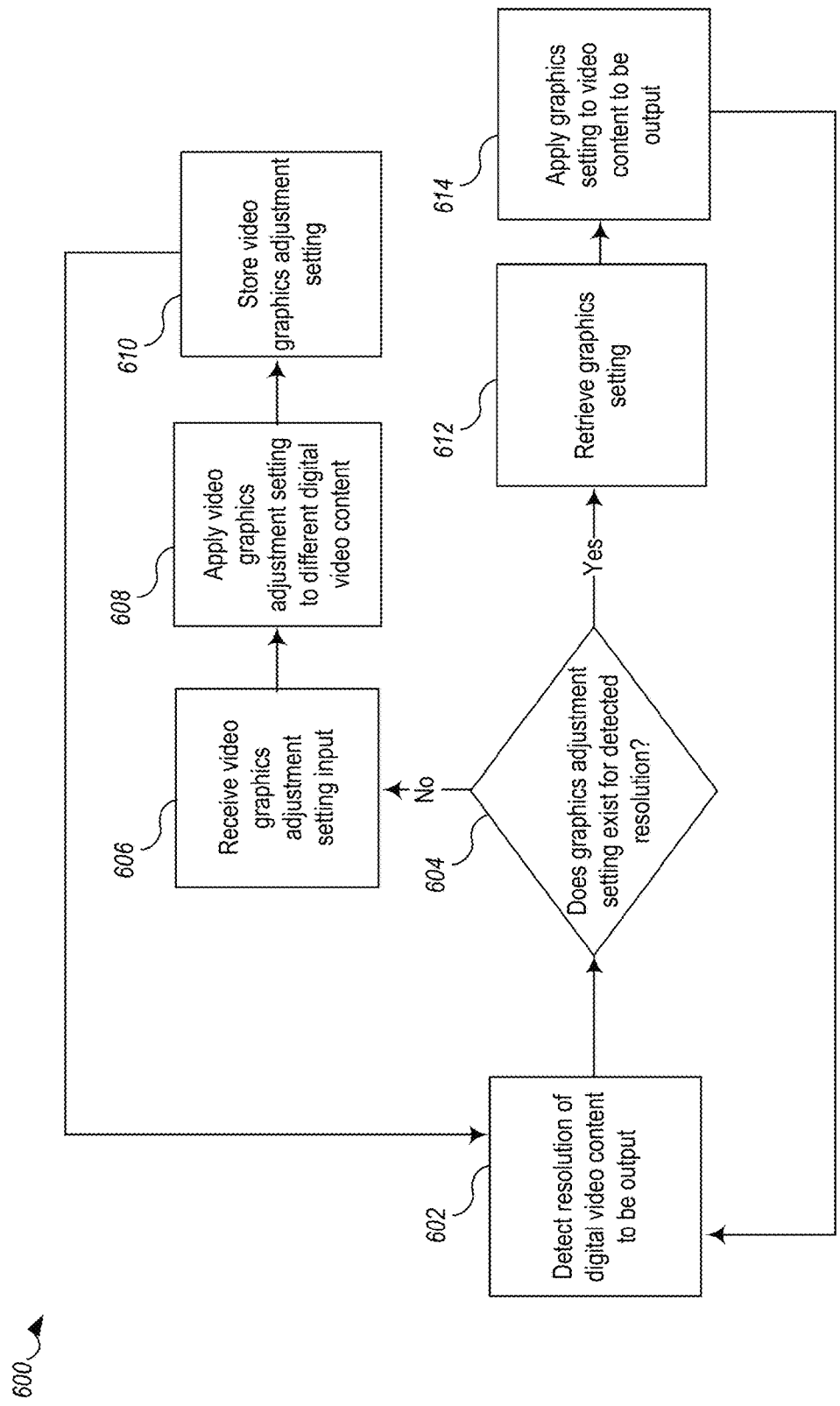
FIG. 6 is a flow diagram of a method of providing graphics adjustment based on output resolution, according to another example embodiment.

FIG. 6 is a flow diagram of a method 600 of providing graphics adjustment based on output resolution, according to another example embodiment.

At 602, the receiving device 118 detects different resolutions of different digital video content to be output from the receiving device to a display as the various different digital video content is received by the receiving device 118.

At 604, the receiving device 118 determines whether there exists in storage a corresponding video graphics adjustment setting associated with the detected resolution of the digital video currently being received. The receiving device may perform this function by searching in its local and/or a remote database for a corresponding previously stored video graphics adjustment setting associated with the detected resolution. The association with the detected resolution is that application of the corresponding previously stored video graphics adjustment setting to digital video content having the detected resolution avoids edges of digital video frames of digital video content having the detected resolution being cut of when presented on the display. If the receiving device 118 determined there does not exist in storage a corresponding video graphics adjustment setting associated with the detected resolution, the process proceeds to 606.

At 606, the receiving device 118 receives input from a user indicating a video graphics adjustment setting of the digital video content, for example, as it is being displayed on the presentation device.

At 608, the receiving device 118 applies the video graphics adjustment setting to the different digital video content. This application of the graphics setting avoids the digital video frames of the digital video content having the resolution being cut off when presented on the display. For example the user may use the remote 128 to input instructions to the receiving device 118 to resize the digital video content, which may cause the receiving device 118 to downscale the digital video frames of the digital video content such that the entire video frame fits into a smaller area on the screen, which then allows for edges of the originally sized area to be cut off without losing any part of the scene.

At 610, the receiving device 118 associates the video graphics adjustment setting with the resolution of the digital video content that was output to the display and, in some embodiments, with the particular presentation device. The process then returns to 602 to process further digital video content.

At 612, if the receiving device 118 determined there does exist in storage a corresponding video graphics adjustment setting associated with the detected resolution, the receiving device 118 retrieves the corresponding previously stored video graphics adjustment setting from storage.

At 614, the receiving device 118, in response to the retrieving the corresponding previously stored video graphics adjustment setting, applies the corresponding previously stored video graphics adjustment setting to the current digital video content to be output from the receiving device. The process then returns to 602 to process further digital video content.

While various embodiments have been described herein above, it is to be appreciated that various changes in form and detail may be made without departing from the spirit and scope of the invention(s) presently or hereafter claimed.

The invention claimed is:

1. A system for video graphics adjustment comprising:
   at least one processor;
   at least one memory in communication with the at least one processor of a receiving device, the at least one memory having computer-executable instructions stored thereon that, when executed, cause the receive device to perform operations comprising:
      detecting a resolution of digital video content to be output from the receiving device to a display;
      in response to the detecting the resolution of the digital video content to be output from the receiving device to the display, retrieving, based on the detected resolution of the digital video content, a previously stored video graphics adjustment setting having a previously stored association with the detected resolution of the digital video content, the previously stored association being that application of the video graphics adjustment setting to digital video content having the detected resolution avoids edges of digital video frames of digital video content having the detected resolution being cut of when presented on the display;
      in response to the at least one processor of the receiving device retrieving the previously stored video graphics adjustment setting having the previously stored association with the detected resolution of the digital video content to be output from the receiving device, applying the previously stored video graphics adjustment setting to the digital video content to be output from the receiving device before the digital video content to be output from the receiving device is presented on the display;
      before the detecting the resolution of the digital video content to be output from the receiving device to a display, outputting, from the receiving device for presentation on the display, first different digital video content having the resolution, wherein edges of digital video frames of the first different digital video content having the resolution are cut off when presented on the display;
      receiving input from a user indicating the video graphics adjustment setting;
      applying the video graphics adjustment setting to the first different digital video content having the resolution, wherein the video graphics adjustment setting being applied to the first different digital video content having the resolution avoids the digital video frames of the first different digital video content having the resolution being cut off when presented on the display;
      associating the video graphics adjustment setting with the resolution of the first different digital video content that was output to the display; and
      storing for future retrieval by the receiving device, the video graphics adjustment setting and the association of the video graphics adjustment setting with the resolution of the first different digital video content that was output to the display.

2. The system of claim 1, wherein the operations further comprise:
   outputting third different digital video content having a different resolution, wherein edges of digital video frames of the third different digital video content having the different resolution are cut off when presented on the display;
   receiving input from a user indicating a different video graphics adjustment setting;
   applying the different video graphics adjustment setting to the third different digital video content having the different resolution, wherein the different video graphics adjustment setting being applied to the third different digital video content having the different resolution avoids the digital video frames of the third different digital video content having the different resolution being cut off when presented on the display;
   associating the different video graphics adjustment setting with the different resolution of the third different digital video content that was output to the display; and
   storing, for future retrieval by a receiving device, the different video graphics adjustment setting and the association of the different video graphics adjustment setting with the different resolution of the third different digital video content that was output to the display.

3. The system of claim 2, wherein the operations further comprise:
   detecting a resolution of fourth different digital video content to be output from the receiving device to the display;
   in response to the detecting the resolution of the fourth different digital video content to be output from the receiving device to the display, searching for a previously stored video graphics adjustment setting associated with the detected resolution of the fourth different digital video content to be output from the receiving device to the display;
   retrieving the previously stored video graphics adjustment setting associated with the detected resolution of the fourth different digital video content to be output from the receiving device to the display, the association with the detected resolution of the fourth different digital video content being that application of the video graphics adjustment setting associated with the detected resolution of the fourth different digital video content to digital video content having the detected resolution of the fourth different digital video content avoids edges of digital video frames of digital video content having the detected resolution of the fourth different digital video content being cut off when presented on the display; and in response to the retrieving the previously stored video graphics adjustment setting associated with the detected resolution of the fourth different digital video content, applying the previously stored video graphics adjustment setting associated with the detected resolution of the fourth different digital video content to the fourth different digital video content to be output from the receiving device before the fourth different digital video content to be output from the receiving device is presented on the display.

4. The system of claim 3, wherein the detected resolution of the fourth different digital video content is different than the resolution of the first different digital video content and the previously stored video graphics adjustment setting associated with the detected resolution of the fourth different digital video content is different than the previously stored video graphics adjustment setting associated with the resolution of the first different digital video content that was output to the display.

5. The system of claim 2 wherein the resolution of the first different digital video content is a high definition (HD) digital video resolution and the different resolution of the third different digital video content is a video resolution higher than HD resolution.

6. The system of claim 5 wherein the HD digital video resolution is at least 1920 pixels×1080 lines and the different resolution is at least 3840 pixels×2160 lines.

7. The system of claim 1 wherein the video graphics adjustment setting includes a resizing of the digital video content having the detected resolution.

8. The system of claim 7 wherein the resizing of the digital video content having the detected resolution includes downscaling of digital video frames of the digital video content.

9. The system of claim 1 wherein the video graphics adjustment setting includes a repositioning of frames of the digital video content on the display.

10. A non-transitory computer-readable medium having computer-executable instructions stored thereon that, when executed at least one processor of a receiving device, cause the receiving device to perform operations comprising:

detecting a resolution of digital video content to be output from the receiving device to a display;

in response to the detecting the resolution of the digital video content to be output from the receiving device to the display, retrieving, based on the detected resolution of the digital video content, a previously stored video graphics adjustment setting having a previously stored association with the detected resolution of the digital video content, the previously stored association being that application of the video graphics adjustment setting to digital video content having the detected resolution avoids edges of digital video frames of digital video content having the detected resolution being cut of when presented on the display;

in response to the at least one processor of the receiving device retrieving the previously stored video graphics adjustment setting having the previously stored association with the detected resolution of the digital video content to be output from the receiving device, applying the previously stored video graphics adjustment setting to the digital video content to be output from the receiving device before the digital video content to be output from the receiving device is presented on the display;

before the detecting the resolution of the digital video content to be output from the receiving device to a display, outputting, from the receiving device for presentation on the display, first different digital video content having the resolution, wherein edges of digital video frames of the first different digital video content having the resolution are cut off when presented on the display;

receiving input from a user indicating the video graphics adjustment setting;

applying the video graphics adjustment setting to the first different digital video content having the resolution, wherein the video graphics adjustment setting being applied to the first different digital video content having the resolution avoids the digital video frames of the first different digital video content having the resolution being cut off when presented on the display;

associating the video graphics adjustment setting with the resolution of the first different digital video content that was output to the display; and storing for future retrieval by the receiving device, the video graphics adjustment setting and the association of the video graphics adjustment setting with the resolution of the first different digital video content that was output to the display.

11. The non-transitory computer-readable medium of claim 10 wherein the corresponding previously stored video graphics adjustment setting includes a resizing of the different digital video content to be output from the receiving device.

12. The non-transitory computer-readable medium of claim 11 wherein the resizing of the different digital video content to be output from the receiving device device.

13. The non-transitory computer-readable medium of claim 10 wherein the video graphics adjustment setting includes a repositioning of frames of the digital video content on the display.

14. The non-transitory computer-readable medium of claim 10, wherein the operations further comprise:

outputting third different digital video content having a different resolution, wherein edges of digital video frames of the third different digital video content having the different resolution are cut off when presented on the display;

receiving input from a user indicating a different video graphics adjustment setting;

applying the different video graphics adjustment setting to the third different digital video content having the different resolution, wherein the different video graphics adjustment setting being applied to the third different digital video content having the different resolution avoids the digital video frames of the third different digital video content having the different resolution being cut off when presented on the display;

associating the different video graphics adjustment setting with the different resolution of the third different digital video content that was output to the display; and storing, for future retrieval by a receiving device, the different video graphics adjustment setting and the association of the different video graphics adjustment setting with the different resolution of the third different digital video content that was output to the display.

15. The non-transitory computer-readable medium of claim 14, wherein the operations further comprise:

detecting a resolution of fourth different digital video content to be output from the receiving device to the display;

in response to the detecting the resolution of the fourth different digital video content to be output from the receiving device to the display, searching for a previously stored video graphics adjustment setting associated with the detected resolution of the fourth different digital video content to be output from the receiving device to the display;

retrieving the previously stored video graphics adjustment setting associated with the detected resolution of the fourth different digital video content to be output from the receiving device to the display, the association with the detected resolution of the fourth different digital video content being that application of the video graphics adjustment setting associated with the detected resolution of the fourth different digital video content to digital video content having the detected resolution of the fourth different digital video content avoids edges of digital video frames of digital video content having the detected resolution of the fourth different digital video content being cut off when presented on the display; and in response to the retrieving the previously stored video graphics adjustment setting associated with the detected resolution of the fourth different digital video content, applying the previously stored video graphics adjustment setting associated with the detected resolution of the fourth different digital video content to the fourth different digital video content to be output from the receiving device before the fourth different digital video content to be output from the receiving device is presented on the display.

16. The non-transitory computer-readable medium of claim 15, wherein the detected resolution of the fourth different digital video content is different than the resolution of the first different digital video content and the previously stored video graphics adjustment setting associated with the detected resolution of the fourth different digital video content is different than the previously stored video graphics adjustment setting associated with the resolution of the first different digital video content that was output to the display.

17. The non-transitory computer-readable medium of claim 14 wherein the resolution of the first different digital video content is a high definition (HD) digital video resolution and the different resolution of the third different digital video content is a video resolution higher than HD resolution.

18. The non-transitory computer-readable medium of claim 17 wherein the HD digital video resolution is at least 1920 pixels×1080 lines and the different resolution is at least 3840 pixels×2160 lines.

* * * * *